(12) United States Patent
Jacques et al.

(10) Patent No.: US 11,156,479 B2
(45) Date of Patent: Oct. 26, 2021

(54) VARIABLE PITCH LINEAR DISPLACEMENT SENSOR

(71) Applicant: SCHAEFFLER TECHNOLOGIES AG & CO. KG, Herzogenaurach (DE)

(72) Inventors: Timothy Jacques, Troy, MI (US); Shaun Tate, Grand Blanc, MI (US); Constantine Mastory, Sterling Heights, MI (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 9 days.

(21) Appl. No.: 16/502,342

(22) Filed: Jul. 3, 2019

(65) Prior Publication Data

US 2021/0003423 A1   Jan. 7, 2021

(51) Int. Cl.
   *G01D 5/20*   (2006.01)
(52) U.S. Cl.
   CPC .................................. *G01D 5/2033* (2013.01)
(58) Field of Classification Search
   None
   See application file for complete search history.

(56) References Cited

U.S. PATENT DOCUMENTS

| 6,097,183 | A | 8/2000 | Goetz et al. |
| 6,788,048 | B2 | 9/2004 | Hedayat et al. |
| 2002/0011840 | A1* | 1/2002 | Li .......................... G01D 5/147 |
| | | | 324/207.21 |
| 2005/0012500 | A1 | 1/2005 | Braun et al. |
| 2012/0299586 | A1* | 11/2012 | Martin ................... G01D 5/145 |
| | | | 324/207.25 |
| 2014/0345447 | A1* | 11/2014 | Cyren ................. F16H 25/2015 |
| | | | 91/1 |

FOREIGN PATENT DOCUMENTS

EP           0404534 A1    12/1990

* cited by examiner

*Primary Examiner* — Nasima Monsur
(74) *Attorney, Agent, or Firm* — Dickinson Wright PLLC

(57) ABSTRACT

A linear contactless displacement sensor assembly is provided. The sensor assembly can include a shaft configured to translate linearly, and a sleeve rotatably coupled about the shaft and linearly fixed such that the shaft can linearly translate through the sleeve as the sleeve rotates. The sleeve includes an outer surface having a threading that varies in pitch. A tooth is disposed in the threading and fixed on a linear track such that the tooth moves linearly as the sleeve rotates. A sensor is configured to sense a location of the tooth along the linear track. This allows the sensor assembly to measure an amount of linear movement and a corresponding amount of rotation of the sleeve.

17 Claims, 5 Drawing Sheets

VARIABLE PITCH LINEAR DISPLACEMENT SENSOR

TECHNICAL FIELD

The present disclosure relates to a displacement sensor, more particularly a linear displacement sensor having a variable thread pitch.

BACKGROUND

According to Faraday's Law, the magnitude of the circulation of the electric field around a closed loop is equal to the rate of change of the magnetic flux through the area enclosed by the loop. In use, a magnet passing over coils changes the magnetic field around the coils, creating a voltage. Utilizing this principle, sensor technology has evolved to include permanent magnet linear contactless displacement (PLCD) sensors, in which two oppositely-wound coils are excited by a magnet, the magnet changes the magnetic field around the coils to create a voltage, and as the magnet moves across the length of the sensor, one coil registers a voltage increase and the other registers a voltage decrease. This inverse relationship allows the sensor to accurately provide a location of the magnet, and thus derive linear location.

SUMMARY

In one embodiment, a linear contactless displacement sensor assembly is provided. The sensor assembly includes a shaft configured to translate linearly, and a sleeve rotatably coupled about the shaft and linearly fixed such that the shaft can linearly translate through the sleeve as the sleeve rotates. The sleeve includes an outer surface having a threading that varies in pitch. A tooth is disposed in the threading and fixed on a linear track such that the tooth moves linearly as the sleeve rotates. A sensor is configured to sense a location of the tooth along the linear track.

In another embodiment, a linear contactless displacement sensor assembly is provided. The sensor assembly includes a shaft rotatably fixed and configured to translate linearly. The sensor assembly also includes a sleeve disposed about the shaft, linearly fixed, and coupled to the shaft such that the sleeve rotates as the shaft linearly translates through the sleeve. The sleeve includes an outer surface having a threading. A sensor target is movable along a linear track and has a tooth engaged with the threading such that the tooth moves linearly as the sleeve rotates. A sensor configured to sense a linear location of the sensor target.

In yet another embodiment, a linear contactless displacement sensor assembly is provided. The sensor assembly includes a shaft, a sleeve, and a permanent magnet linear contactless displacement (PLCD) sensor. The sleeve rotates about the shaft as the shaft translates linearly, wherein the sleeve has a threading with a varying pitch. The PLCD sensor includes a permanent magnet connected to or including a tooth that engages the threading.

DETAILED DESCRIPTION

Figure 1:
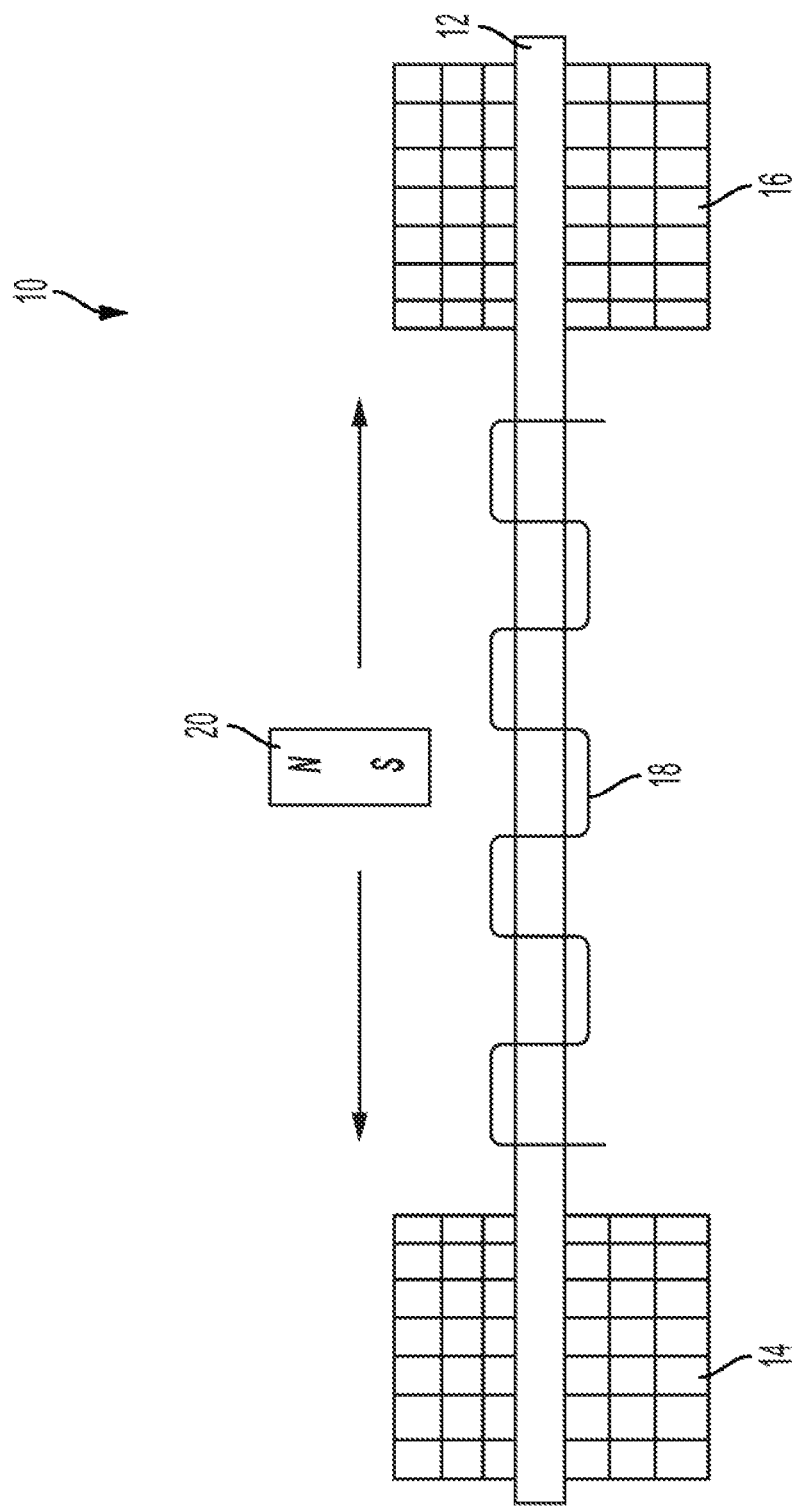
FIG. 1 is a schematic side view of a magnetic position sensor according to one embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Directional terms used herein are made with reference to the views and orientations shown in the exemplary figures. A central axis is shown in the figures and described below. Terms such as "outer" and "inner" are relative to the central axis. For example, an "outer" surface means that the surfaces faces away from the central axis, or is outboard of another "inner" surface. Terms such as "radial," "diameter," "circumference," etc. also are relative to the central axis. The terms "front," "rear," "upper" and "lower" designate directions in the drawings to which reference is made.

In permanent magnet linear contactless displacement (PLCD) sensors, two oppositely-wound coils are excited by a magnet, the magnet changes the magnetic field around the coils to create a voltage, and as the magnet moves across the length of the sensor, one coil registers a voltage increase and the other registers a voltage decrease. This inverse relationship allows the sensor to accurately provide a location of the magnet, and thus derive linear location.

FIG. 1 illustrates the concept of a PLCD sensor 10, according to one embodiment. The PLCD sensor can be another type of contactless sensor, and permanent magnets is just one embodiment. The PLCD sensor 10 includes a magnetic core 12, and a pair of coils 14, 16. The coils 14, 16 are located at spaced-apart ends of the core 12. A secondary coil 18 is wound about the core 12 and is connected to and disposed between the coils 14, 16. The secondary coil 18 may occupy the entire length between the coils 14, 16.

An object such as a magnet 20 is movable along the length of the core 12 in opposite linear directions. The magnet 20 may be a permanent magnet generating a magnetic field, and may be spaced from the core 12 by a gap. As the magnet 20 moves linearly along the core 12 (e.g., to the left in FIG. 1), one coil 14 registers a voltage decrease and the other coil 16 registers a voltage increase. The difference between the two voltages, or the magnitude of the voltage change, can allow the sensor 10 to provide a precise location of the magnet 20 along the core 12. In application, either the magnet or the core can be connected to a linearly-movable part, and thus the sensor 10 can output the precise location of that part.

The overall length of the PLCD sensor 10 may be constrained due to the degrading strength of the magnetic field as the magnet 20 moves further from the coils 14, 16. In other words, as the core 12 is designed to fit longer and longer spaces, the distance between the coils 14, 16 increases to a point where the magnet may no longer interact with the coils 14, 16 for proper sensor readings. With a linear sensor such as the PLCD sensor 10 covering an entire travel length, the sensor voltage is spread across a larger area as the length of the core 12 increases. Thus, the voltage changes for a given displacement can decrease, which reduces the sensitivity of the sensor. This limits packaging space for a sensor. Furthermore, if the sensor 10 is increased in length, this may increase the length of the actuator, which in turn may increase the weight of the vehicle (e.g., the vehicle in which the sensor is a part of), and may potentially affect the kinematics of the accompanying system (e.g., interfering with motion of other parts, etc.).

Therefore, according to various embodiments described herein, a linear contactless displacement sensor is disclosed having a rotating component with a variable pitch thread.

Figure 2:
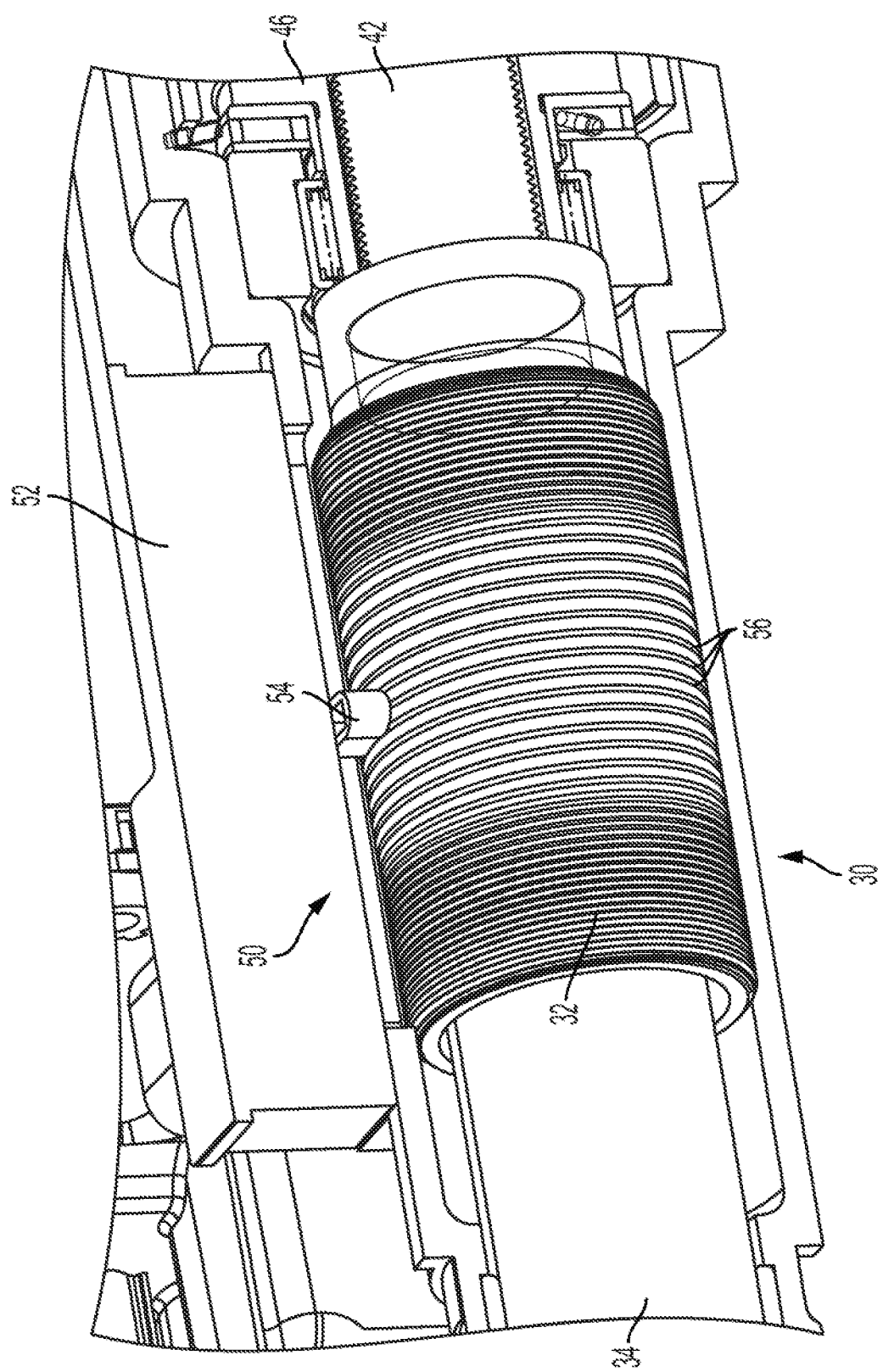
FIG. 2 is a perspective view of a variable pitch linear displacement sensor, according to one embodiment.
Figure 3:
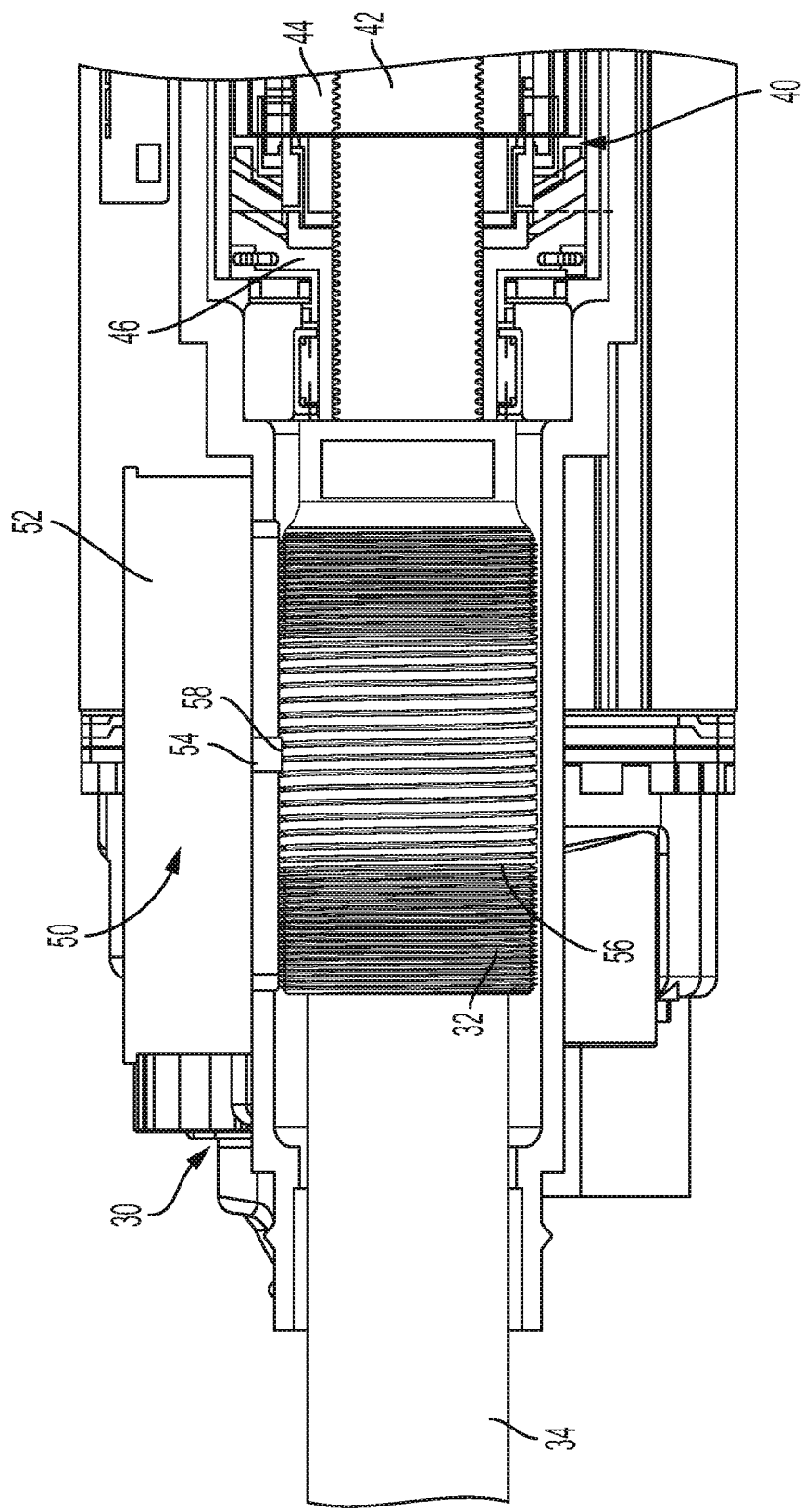
FIG. 3 is a cross-sectional view of the variable pitch linear displacement sensor of FIG. 2, according to one embodiment.

Referring to FIGS. 2 and 3, a linear contactless displacement sensor assembly 30 is illustrated according to one embodiment. The linear contactless displacement sensor assembly 30 includes a rotatable component (also referred to as a sleeve) 32 disposed about a central shaft 34. The shaft 34 translates linearly within the sleeve 32 while the sleeve 32 remains linearly fixed but rotates about the translating shaft 34. In other words, the sleeve 32 is rotatably disposed about the shaft 34, and the shaft 34 is linearly translatable through the sleeve 32.

The shaft 34 may be part of a central rear wheel steering actuator of a vehicle, for example. A central rear wheel steering actuator allows the rear wheels to independently steer to help larger vehicles (trucks, etc.) turn sharper corners. The shaft 34 may linearly translate to actuate the rear wheel steering, and thus knowledge of the linear location and position of the shaft 34 may be desired, especially with heightened accuracy at times when the vehicle is traveling at higher speeds.

The sleeve 32 may rotate and the shaft 34 may translate via several possible structures. In one embodiment, a planetary gearset or planetary screw assembly 40 is configured to move the linear contactless displacement sensor assembly 30. The planetary screw assembly 40 is made of a central shaft 42, which acts as a sun gear for the screw assembly. The central shaft 42 may be connected with or part of the same shaft 34 of the linear contactless displacement sensor assembly 30 such that the shafts 34, 42 linearly translate together. The shaft 42 has outer teeth that engage with a plurality of outer cylindrical planets 44 (also referred to as nuts) disposed annularly about the shaft 42, such that the outer cylindrical planets 44 can collectively rotate about the shaft 42. Rotationally coupled radially outward from the outer shaft 44 is a shaft 46 that rotates with the collective rotation of the outer cylindrical planets 44. The shaft 46 remains linearly fixed. The sleeve 32 is fixed (e.g., via an interference fit or press fit) with the shaft 46 at the neck 33 of the sleeve 32, and therefore rotates as the planets 44 rotate but remains linearly fixed.

In operation, when an actuator such as a motor (not shown) is powered, a housing surrounding the outer cylindrical planets 44 rotates, causing collective rotation of the outer cylindrical planets 44 about the threading of the shaft 42. As the shaft 42 is rotationally fixed, the shaft is forced by the planets 44 to travel linearly. Shaft 42 is coupled to or an extension of shaft 34, and therefore shaft 34 is also translated linearly. Meanwhile, the sleeve 32 being fixed with the outer shaft 46 rotates about the shaft 34 as the shaft 34 translates linearly. This is but one example of a mechanism for moving the shaft 34 linearly and forcing corresponding rotation of the sleeve 32.

The linear contactless displacement sensor assembly 30 includes a sensor, such as a permanent magnet linear contactless displacement (PLCD) sensor 50. The PLCD sensor 50 includes an outer housing 52 including a groove or opening in a surface facing the sleeve 32. The PLCD sensor 50 includes a sensor target 54 such as a magnet like a permanent magnet. The sensor target 54 is configured to move linearly through the groove in the outer housing 52. To move the sensor target 54 linearly, the sleeve 32 is provided with outer threading 56, and the sensor target 54 is provided with a tooth 58. The tooth 58 is sized and configured to fit and engage with the threading 56, such that rotation of the sleeve 32 causes the tooth 58 to move linearly to follow the threading 56. As the tooth 58 moves to follow the outer threading 56, the sensor target 54 moves along the groove in the outer housing 52. As the sensor target 54 moves linearly, the PLCD sensor 50 operates such as the sensor 10 described with reference to FIG. 1.

In one embodiment, the outer threading 56 is provided with a variable or varying thread pitch. In other words, along an axial direction of the sleeve 32 the number of threads per unit of measurement can vary.

Figure 4:
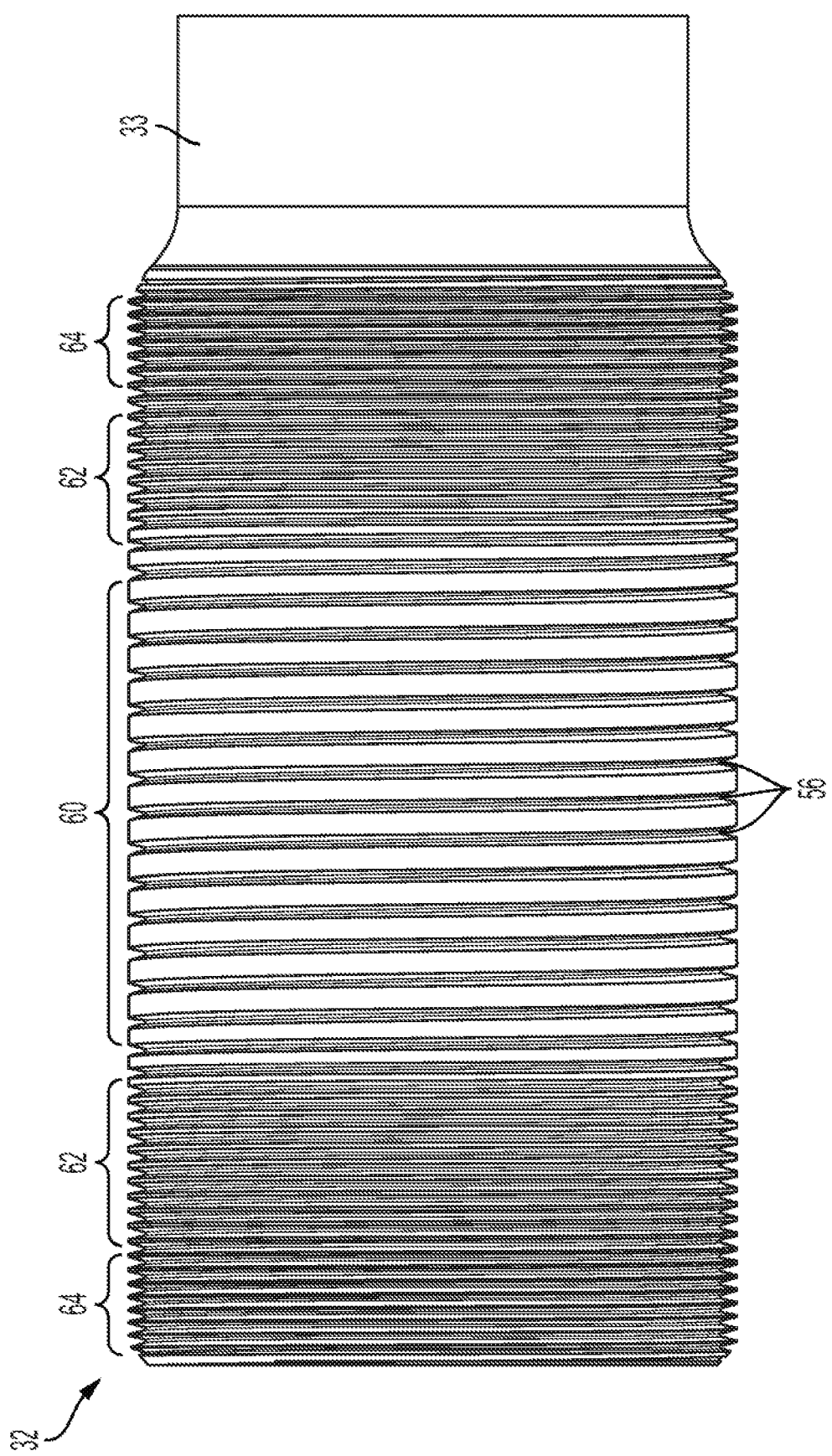
FIG. 4 is a side view of a variable pitch threaded part, according to one embodiment.

FIG. 4 shows the sleeve 32 in isolation having a variable thread pitch. In one example, three different thread pitches are provided: a central region 60 having a first thread pitch, an intermediate region 62 having a second thread pitch, and a peripheral region 64 having a third thread pitch. The thread pitch of the central region 60 may be the highest of the thread pitches, causing greater linear movement of the sensor target 54 per rotation of the sleeve 32. Conversely, the thread pitch of the peripheral regions 64 may be the lowest of the thread pitches, causing the least amount of linear movement of the sensor target 54 per rotation of the sleeve 32.

Among other benefits, the variable thread pitch provides differing amounts of accuracy and sensitivity of the PLCD sensor 50. For example, during high-speed maneuvers with rear-wheel turning, such as a lane change or trailer sway, the change in angle of the rear wheels is relatively small. However, because the change in angle is occurring at a high speed, the rear wheel turning actuator needs to be very sensitive to the displacement. Therefore, the accuracy and sensitivity of the PLCD sensor 50 should be at its highest, e.g., the lowest thread pitch causing the most linear movement of the sensor target 54 per rotation of the sleeve 32. Meanwhile, low-speed maneuvers such as turning in a parking lot require larger rear-wheel angles, but the accuracy of the wheel angles is less critical to safety because of the lower speeds. As the larger turning angle of the rear wheels causes larger movement of the shaft 34 and more rotation of the sleeve 32, the sensitivity and accuracy of the movement of the sensor target 54 need not be as critical. As a result, the pitch of the thread can be decreased (e.g., increased number of threads per unit of linear measurement) in the peripheral regions 64 of the sleeve 32.

In one embodiment, the tooth 58 is a single tooth, as multiple teeth may hinder rotation of the sleeve 32 due to the varying thread pitch. The use of a single tooth allows the sensor target 54 to move across the varying pitches of the threading 56 without the potential of binding or skipping teeth. In another embodiment, a spring-loaded second tooth is provided that can move back and forth linearly along the sleeve as the sleeve rotates, and moving linearly relative to the tooth 58.

In one embodiment of a summary of operation of the linear contactless displacement sensor assembly 30, a motor or other actuator causes rotational movement of a planetary screw assembly 40. With the shaft 34, 42 being rotationally fixed, this causes linear movement of the shaft 34, 42. Meanwhile, the sleeve 32 is rotationally fixed to a component of the planetary screw assembly 40. This provides linear movement of the shaft 34 with simultaneous and corresponding rotational movement of the sleeve 32. A single tooth 58 that follows the threading 56 of the sleeve 32 causes linear movement of the sensor target 54. The PLCD sensor 50 detects the linear movement of this sensor target 54, and therefore the amount of linear movement of the shaft 34 can be detected.

Figure 5:
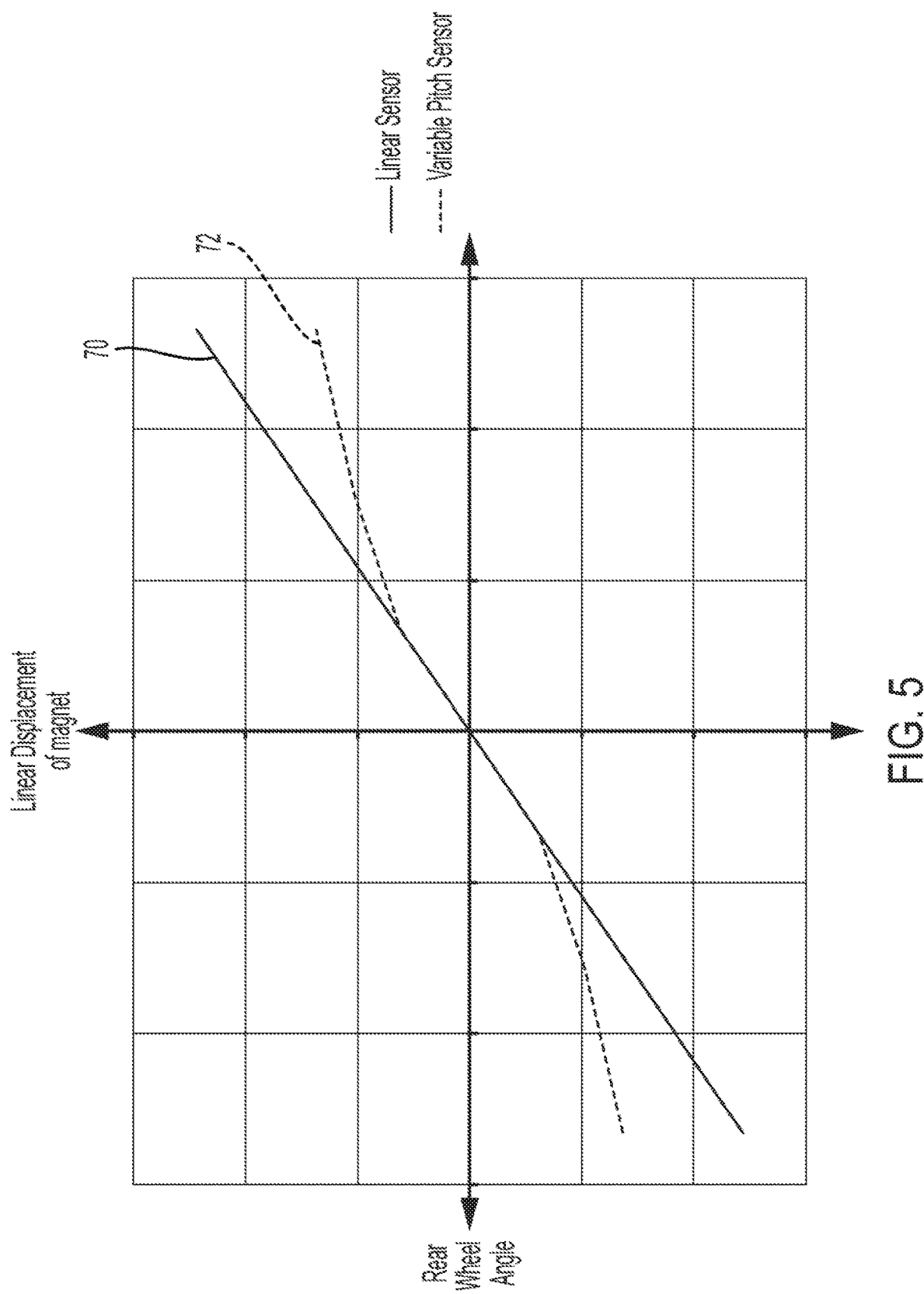
FIG. 5 is a graph illustrating a relationship between a rear wheel angle and a linear displacement of a magnet, according to one embodiment.

As mentioned, the linear contactless displacement sensor assembly 30 can be utilized as part of a rear-wheel turning actuator, such that turning of the rear wheels results in sensed linear movement of the shaft 34. FIG. 5 shows a graphical illustration of the relationship of the amount of linear displacement of the sensor target 54 (Y-axis) and the amount of turning of the rear wheels (X-axis). A first line 70 is provided as a baseline for a sleeve with a constant thread pitch throughout. The movement of the rear wheels correlates with a linear displacement of the sensor target 54 in a 1:1 ratio throughout operation. A second line 72 is provided for a sleeve 32 with variable thread pitch. The central region 60 of the sleeve 32 results in a 1:1 ratio of movement of the rear wheels and a linear displacement of the sensor target 54. However, the decrease in thread pitch from the central region 60 to the intermediate region 62 changes the ratio to 2:1 of movement of rear wheel to the linear displacement of the sensor target. In other words, the same amount of movement of the rear wheels causes less translation of the sensor target 54. And, this line again changes in slope with the transition from the intermediate region 62 to the peripheral region 64, with the ratio changing to 3:1.

The line 72 is illustrated with distinct changes of slope corresponding to distinct changes in thread pitch of the sleeve 32. However, in other embodiments, there are more than three regions of thread pitch, up to an infinite number. In other words, the transition from one thread pitch to another thread pitch along the sleeve 32 may be gradual and smooth, resulting in a smooth, curved line in FIG. 5.

It should be understood that the term "thread pitch" used herein refers to the distance between thread peaks. An increase in the thread pitch correlates to a decrease in the number of thread peaks per unit of measurement (e.g., one inch). Referring to FIG. 4, the thread pitch decreases from the central region to the intermediate region, and decreases again from the intermediate region to the peripheral region.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

PARTS LIST

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

10 permanent magnet linear contactless displacement sensor
12 core
14 coils
16 coils
18 secondary coils
20 magnet
30 linear contactless displacement sensor assembly
32 sleeve
33 neck
34 shaft
40 planetary screw assembly
42 central shall
44 outer cylindrical planets
46 shaft
50 permanent magnet linear contactless displacement sensor
52 housing
54 sensor target
56 outer threading
58 tooth
60 central region
62 intermediate region
64 peripheral region
70 first line
72 second line

What is claimed is:

1. A linear contactless displacement sensor assembly comprising:
a shaft configured to translate linearly;
a sleeve rotatably coupled about the shaft and linearly fixed such that the shaft can linearly translate through the sleeve as the sleeve rotates relative to the shaft in which the sleeve can rotate at a different rate than the shaft or the sleeve can rotate while the shaft is rotationally fixed, wherein the sleeve includes an outer surface having a threading that varies in pitch in which the threading has a first region having a first thread pitch, and a second region with a second thread pitch that is different than the first thread pitch;
a tooth disposed in the threading and fixed on a linear track such that the tooth moves linearly as the sleeve rotates; and
a sensor configured to sense a location of the tooth along the linear track.

2. The linear contactless displacement sensor assembly of claim 1, wherein the threading has a third region having a third thread pitch that differs from the first thread pitch and the second thread pitch.

3. The linear contactless displacement sensor assembly of claim 1, wherein the threading has a central region having the first thread pitch, and a peripheral region having the second thread pitch that is less than the first thread pitch.

4. The linear contactless displacement sensor assembly of claim 3, wherein the threading has an intermediate region between the central region and the peripheral region that has a third thread pitch less than the first thread pitch and greater than the second thread pitch.

5. The linear contactless displacement sensor assembly of claim 1, wherein no more than one tooth engages the threading.

6. The linear contactless displacement sensor assembly of claim 1, wherein the sensor is a permanent magnet linear contactless displacement (PLCD) sensor, and the tooth is coupled to or includes a permanent magnet.

7. A linear contactless displacement sensor assembly comprising:
 a shaft rotatably fixed and configured to translate linearly;
 a sleeve disposed about the shaft, linearly fixed, and coupled to the shaft such that the sleeve rotates relative to the shaft as the shaft linearly translates through the sleeve, wherein the sleeve includes an outer surface having a threading that varies in pitch in which the threading has a first region having a first thread pitch and a second region with a second thread pitch that is different than the first thread pitch;
 a sensor target moveable along a linear track and having a tooth engaged with the threading such that the tooth moves linearly as the sleeve rotates; and
 a sensor configured to sense a linear location of the sensor target.

8. The linear contactless displacement sensor assembly of claim 7, wherein the first region is a central region and the second region is a peripheral region.

9. The linear contactless displacement sensor assembly of claim 8, wherein the threading has an intermediate region between the central region and the peripheral region that has a third thread pitch less than the first thread pitch and greater than the second thread pitch.

10. The linear contactless displacement sensor assembly of claim 7, wherein the tooth is a single tooth and an only tooth that engages the threading.

11. The linear contactless displacement sensor assembly of claim 7, further comprising an actuator configured to cause linear translation of the shaft and rotational movement of the sleeve.

12. The linear contactless displacement sensor assembly of claim 11, wherein the actuator includes a planetary screw set including a plurality of planets linearly fixed and configured to rotate about threading of the shaft to cause linear movement of the shaft.

13. A linear contactless displacement sensor assembly comprising:
 a shaft;
 a sleeve rotatably coupled about the shaft and linearly fixed such that the shaft can linearly translate through the sleeve as the sleeve rotates relative to the shaft in which the sleeve can rotate at a different rate than the shaft or the sleeve can rotate while the shaft is rotationally fixed, wherein the sleeve has a threading with a varying pitch in which the threading has a first region having a first thread pitch, and a second region with a second thread pitch that is different than the first thread pitch; and
 a permanent magnet linear contactless displacement (PLCD) sensor including a permanent magnet connected to or including a tooth that engages the threading.

14. The linear contactless displacement sensor assembly of claim 13, wherein the permanent magnet is constrained to move in a linear direction along the sleeve as the sleeve rotates.

15. The linear contactless displacement sensor assembly of claim 13, wherein the threading has a central region having the first thread pitch, and a peripheral region having the second thread pitch less than the first thread pitch.

16. The linear contactless displacement sensor assembly of claim 15, wherein the threading has an intermediate region between the central region and the peripheral region that has a third thread pitch less than the first thread pitch and greater than the second thread pitch.

17. The linear contactless displacement sensor assembly of claim 13, wherein the sleeve includes a neck that is press-fit onto a secondary shaft that is coupled to a planetary screw set assembly that is configured to, when activated, rotate the sleeve and linearly translate the shaft.

\* \* \* \* \*